(12) United States Patent
Nieder-Vahrenholz et al.

(10) Patent No.: US 8,151,952 B2
(45) Date of Patent: Apr. 10, 2012

(54) PROPORTIONAL CONTROL VALVE

(75) Inventors: Axel Nieder-Vahrenholz, Eschborn (DE); Christian Courth, Frankfurt (DE); Fabian Wey, Karlsruhe (DE); Jochen Klein, Darmstadt (DE); Jan Hoffmann, Rosbach (DE); Harald Biller, Eschborn (DE); Marcus Forche, Frankfurt (DE); René Lenz, Frankfurt am Main (DE)

(73) Assignee: Continental Teves AG & Co. oHG (DE)

( * ) Notice: Subject to any disclaimer, the term of this patent is extended or adjusted under 35 U.S.C. 154(b) by 295 days.

(21) Appl. No.: 12/447,942

(22) PCT Filed: Oct. 29, 2007

(86) PCT No.: PCT/EP2007/061587
§ 371 (c)(1),
(2), (4) Date: Nov. 12, 2009

(87) PCT Pub. No.: WO2008/052954
PCT Pub. Date: May 8, 2008

(65) Prior Publication Data
US 2010/0065765 A1    Mar. 18, 2010

(30) Foreign Application Priority Data

Nov. 2, 2006 (DE) .......................... 10 2006 051 547
May 22, 2007 (DE) .......................... 10 2007 023 716

(51) Int. Cl.
  *F16F 9/34* (2006.01)
(52) U.S. Cl. ............... 188/266.2; 188/322.13; 188/281; 137/487.5; 251/129.01; 251/129.13
(58) Field of Classification Search ............... 188/266.2, 188/322.13, 299.1, 281, 282.2, 282.4; 137/487.5, 137/489; 251/129.01, 129.02, 129.13, 129.15
See application file for complete search history.

(56) References Cited

U.S. PATENT DOCUMENTS

| | | | |
|---|---|---|---|
| 4,300,508 A | 11/1981 | Streit et al. | |
| 4,773,671 A | 9/1988 | Inagaki | |
| 5,487,455 A | 1/1996 | Feigel | |
| 5,611,413 A | 3/1997 | Feigel | |
| 5,842,688 A | 12/1998 | Dore et al. | |
| 2010/0199519 A1* | 8/2010 | Battlogg | 36/83 |

FOREIGN PATENT DOCUMENTS

| | | |
|---|---|---|
| DE | 28 41 781 A1 | 4/1980 |
| DE | 37 05 508 A1 | 8/1987 |
| DE | 39 20 064 A1 | 1/1991 |

(Continued)

*Primary Examiner* — Pamela Rodriguez
(74) *Attorney, Agent, or Firm* — RatnerPrestia

(57) ABSTRACT

The invention relates to a proportional control valve for the variable hydraulic adjustment of the damping force of a shock absorber, for which purpose the proportional control valve has a throttle function which can be set by varying the strength I of the electric current. The invention provides that on the basis of an instantaneous level of the electrical current Iist the proportional control valve is first closed by increasing the current to a maximum current strength $I_{max}$ for a short time period $t_{overdrive}$ in order to change the damping force F, and the proportional control valve is then opened again by reducing the current strength I to a defined average current strength I in which the proportional valve assumes an intermediate position which results in a volume flow Q which corresponds to the desired change in the damping force F.

9 Claims, 3 Drawing Sheets

Desired characteristic diagram profile:

FOREIGN PATENT DOCUMENTS

| | | |
|---|---|---|
| DE | 40 21 486 A1 | 1/1992 |
| DE | 42 06 380 A1 | 9/1993 |
| DE | 41 29 581 C2 | 3/1997 |
| DE | 696 06 347 T2 | 6/2000 |
| DE | 10 2005 023 547 A1 | 7/2006 |
| DE | 10 2006 014 463 A1 | 8/2007 |
| EP | 1 486 710 A1 | 12/2004 |
| WO | WO 92/12359 | 7/1992 |
| WO | WO 97/31197 | 8/1997 |
| WO | WO 01/04528 A1 | 1/2001 |
| WO | WO 2007/009907 A1 | 1/2007 |

* cited by examiner

PROPORTIONAL CONTROL VALVE

CROSS REFERENCE TO RELATED APPLICATIONS

This application is the U.S. National Phase application of PCT International Application No. PCT/EP2007/061587, filed Oct. 29, 2007, which claims priority to German Patent Application No. DE102006051547.1, filed Nov. 2, 2006 and German Patent Application No. DE102007023716.4, filed May 22, 2007, the contents of such applications being incorporated by reference herein.

BACKGROUND OF THE INVENTION

1. Field of the Invention

The invention relates to a proportional control valve for the variable adjustment of the damping force of a shock absorber.

2. Description of the Related Art

DE 10 2006 014 463 A1 has already disclosed a proportional control valve for the variable adjustment of the damper characteristic curve of a vibration damper. The method for actuating such a valve influences the dynamics of the entire system to a decisive degree, in particular if it is necessary to switch over in a short period between soft and hard damper characteristic curves during the piston movement of the shock absorber as a result of the change in the exciter current at the valve.

SUMMARY OF THE INVENTION

An object of the present invention is to specify an actuation method for a proportional control valve of the specified type such that the stringent requirements which are made of the dynamics of the entire system are satisfied.

Further features and advantages of the invention emerge from the following description with reference to FIGS. 1-4.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
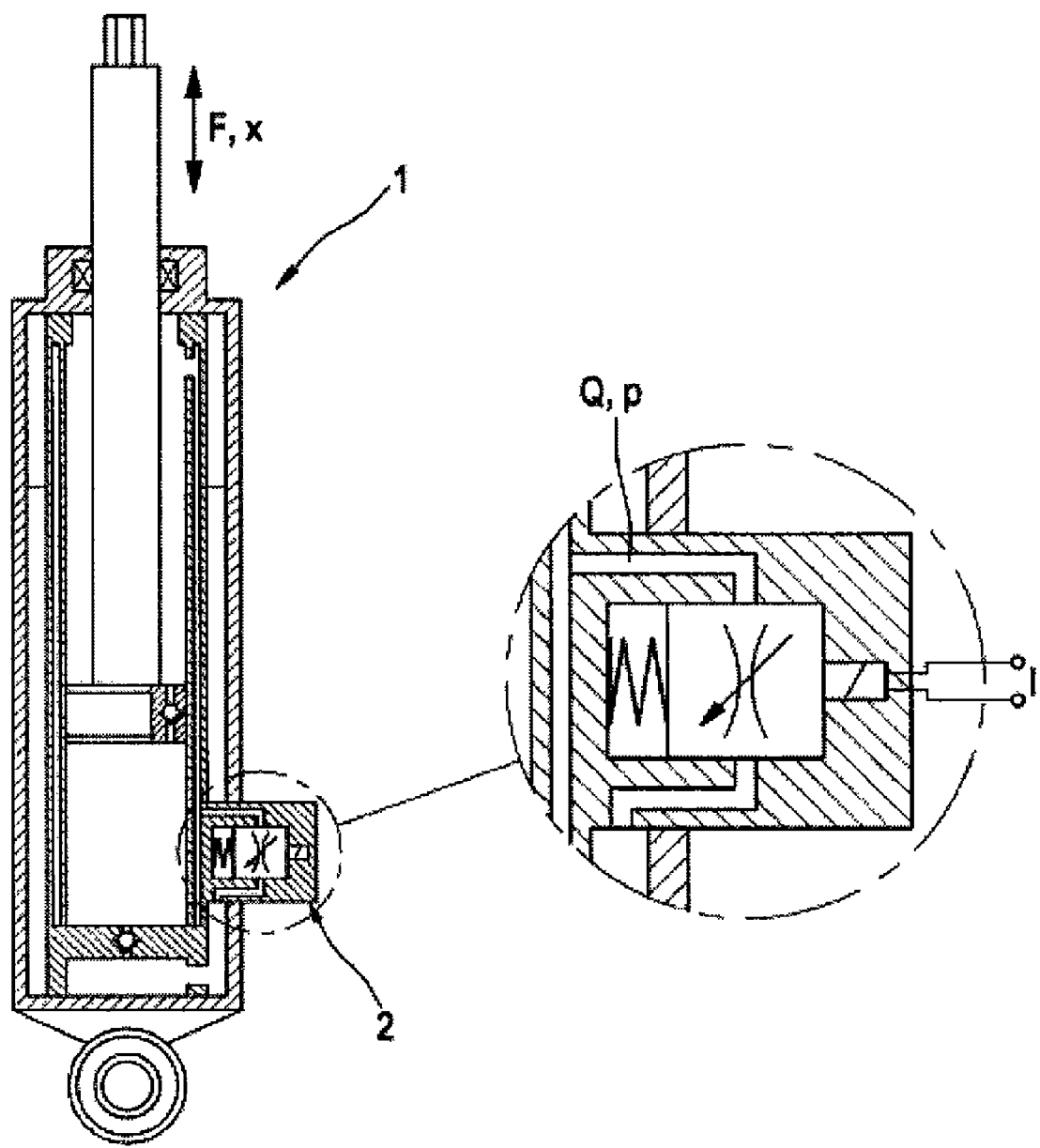
FIG. 1 depicts a shock absorber with a symbolically represented proportional control valve.

Firstly, FIG. 1 shows, for the prior art, a sketch of a shock absorber 1 with a symbolically represented proportional control valve 2 which is integrated by way of example in the side of the shock absorber pipe and is illustrated in an enlarged form next to it. Both when tensile and compressive loading of the shock absorber 1 occurs, a defined hydraulic volume inevitably flows via the proportional control valve 2. The proportional control valve 2 can therefore be used in both directions of movement to influence the characteristic of the shock absorber 1, with the proportional control valve 2 always having a flow through it in the same direction irrespective of the direction of movement.

The throttle function of the proportional control valve permits the damping characteristic of the shock absorber to be significantly influenced. This is possible both in the tensile phase and in the compression phase.

Figure 2:
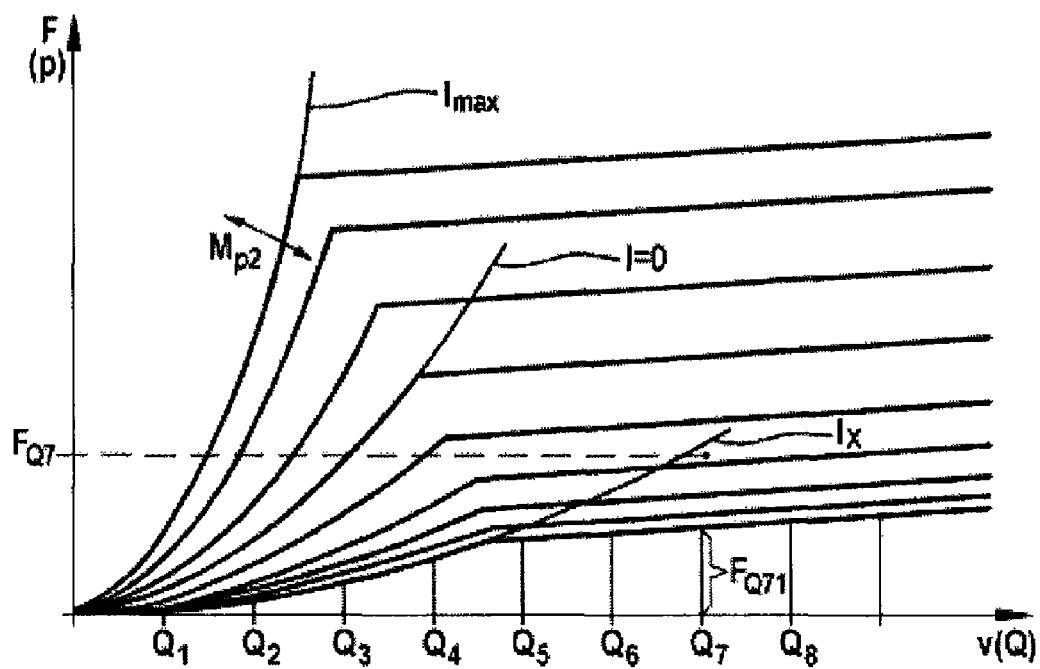
FIG. 2 depicts the damping characteristic of the shock absorber which is desired by the proportional control valve in the form of a characteristic diagram.

In this context, FIG. 2 shows the damping characteristic of the shock absorber which is desired by the proportional control valve in the form of a characteristic diagram. The damping force F or the hydraulic pressure p which can be set by the proportional control valve is shown along the ordinate, as a function of the volume flow Q which flows through the valve and which is illustrated along the abscissa. Any individual characteristic curve can be used to represent the damping characteristic which is to be implemented in the shock absorber by means of the proportional control valve and which is respectively set by varying the electric current at the proportional control valve.

At small volume flows Q, the proportional control valve firstly has the characteristic of a throttle. At relatively high volume flows Q, the proportional control valve acts as a pressure limiting valve. If the throttling effect increases, the proportional valve also corrects the associated limiting pressure in the sense of increasing the limiting pressure.

The proportional control valve is configured in such a way that any desired further characteristic curve between the characteristic curves which are shown by way of example can be obtained in an infinitely variable fashion by means of a suitable electric current.

Figure 3:
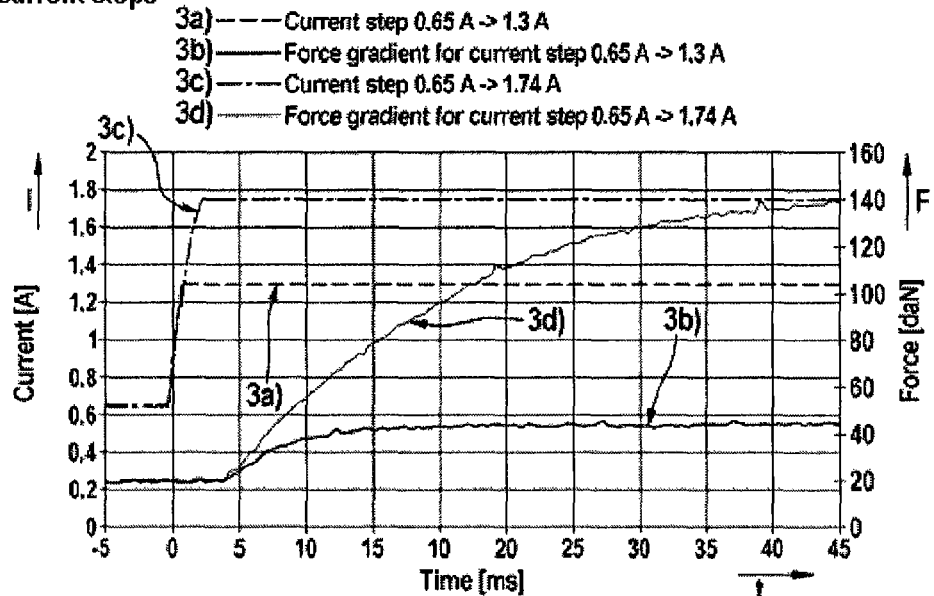
FIG. 3 depicts a measuring diagram illustrating a change in a damping force F, dependent on the actuation of the proportional control valve, for various, sudden changes in the electric current strength I.

By way of example, FIG. 3 shows a measuring diagram illustrating the change in the damping force F, dependent on the actuation of the proportional control valve, for various, sudden changes in the electric current strength I (current steps). Both the values for changing the damping force F and the values for changing the current I can be seen on the ordinate, while the time period t is plotted along the abscissa.

The characteristic curve profiles which can be seen in FIG. 3 make it clear that, depending on the magnitude of the current step, a different pressure increase dynamic and force increase dynamic occurs within the damper hydraulics. When small changes in current occur (see characteristic curve 3a), the speed of the change in force (see characteristic curve 3b) is less than in the case of relatively large values (see characteristic curves 3c, 3d). This behavior occurs as a result of the principle involved in the behavior of the proportional control valve. Depending on the electric current strength I which is applied, the throttle cross section in the proportional control valve changes, and therefore the damping behavior changes. In the present example, a low current strength I corresponds to a large opening cross section of the proportional control valve, and when the exciter current increases the throttling effect of the proportional control valve increases. When the damper speed is constant—in the present example in the measuring diagram the piston speed v=0.16 m/s—the valve opening cross section then changes in accordance with the change in the current strength I, and consequently the damping force F of the shock absorber changes. The damping force F changes most quickly when the proportional control valve is closed completely since in this case no fluid flows away through the valve cross section, as a result of which the pressure increase dynamic in the shock absorber pipe is slowed down.

In order, therefore, also to obtain a high force increase dynamic for small changes in the damping force F, the invention now proposes that the proportional control valve is to be closed completely initially for a short time period toverdrive by means of a high current strength Imax in order subsequently to open it again by lowering the current strength to a defined medium current strength Imit, as a result of which it then moves again into the desired central position in which it sets the medium volume flow Q. In this way it is advantageously possible to jump from low to medium damping forces F with a high force increase dynamic.

Figure 4:
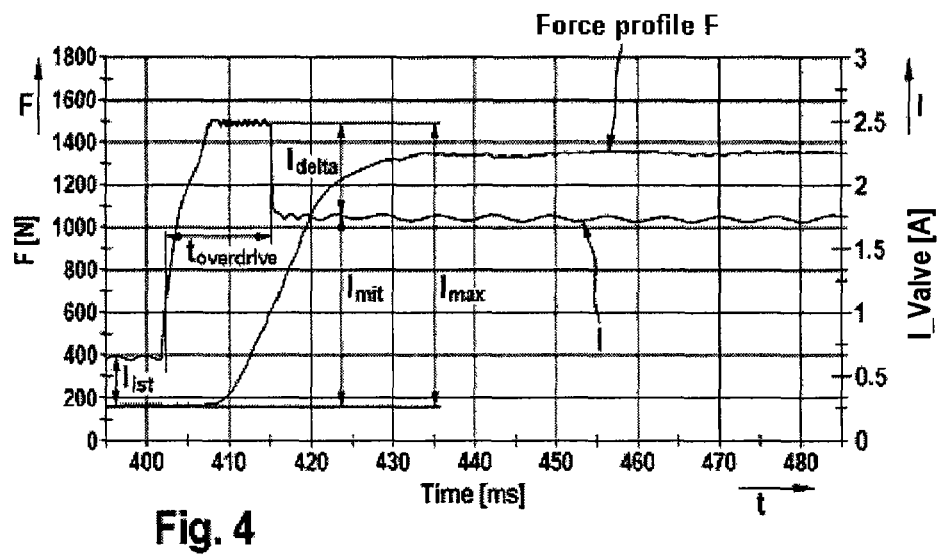
FIG. 4 depicts a profile of the damping force F as a function of a current strength Imax, Imit at the proportional control valve over a time period T or time period toverdrive.

Taking the method of illustration selected in FIG. 3 as a basis, FIG. 4 shows the profile of the damping force F which is characteristic of the invention, as a function of the current strength Imax, Imit at the proportional control valve over the time period T or time period toverdrive. In this context, the chronological profile of the maximum current strength Imax is defined by the short time period toverdrive, during which the proportional control valve is firstly energized with the maximum current strength Imax before the current is made to jump back to a lower, desired medium value of the current strength Imit.

The decisive point of the invention is therefore that starting from an instantaneous value of the level of the current strength Iist a current step is triggered by briefly energizing the proportional valve with Imax, which jump in current is followed by sudden resetting to the desired relatively low current level Imit, as a result of which the proportional valve is briefly closed. It is therefore particularly advantageous that the pressure increase and the desired change in the damping force in the shock absorber occur considerably more quickly than was previously possible.

As a result of the chronological length of the "overdrive", that is to say as a result of the time period toverdrive during which the maximum current strength Imax is effective, the dynamics of the shock absorber can be influenced with regard to the change in the damping behavior. However, it is also necessary to consider here that if the "overdrive" is too long, i.e. the time period toverdrive is too long, the damping force F can rise for a short time period to a force value which is higher than the desired one, that is to say it "overshoots". This behavior can be prevented by adapting the chronological length of the "overdrive" for the various peripheral conditions.

The influencing parameters for this behavior, which vary during the driving mode in the vehicle, are as follows:

--- damper speed: $v_{damper}$
magnitude of the jump in current: Idelta
(corresponds to the magnitude of the desired change in damping)
level of current strength before the change: Iist

---

Therefore, for the time period toverdrive the following requirement arises for the permanent adaptation of the length of the "overdrive" in the driving mode:
toverdrive=f (vdamper, Idelta, Iist)

This adaptation of the "overdrive" is implemented by a characteristic diagram which is stored in the control unit or else by a model-controlled real-time simulation of the force profile in the shock absorber.

In this context, the following static influencing parameters, which may vary depending on the vehicle/vehicle axle, must be taken into account for the formation of models of the "overdrive":
  size of the shock absorber (piston diameter, diameter of the push rod)
  modulus of elasticity of the shock absorber
  proportional behavior of the throttle valve
  viscosity of the shock absorber fluid While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A proportional control valve that is configured for variable hydraulic adjustment of a damping force of a shock absorber, said proportional control valve having a throttle function which can be set by varying a strength of electric current,
  wherein, on the basis of an instantaneous level of a current strength ($I_{ist}$), the proportional control valve is configured to be closed by increasing the current to a maximum current strength ($I_{max}$) for a time period ($t_{overdrive}$) in order to change the damping force (F),
  wherein the proportional control valve is configured to be opened from a closed position by reducing the current strength (I) to a defined medium current strength (Imit) at which the proportional control valve assumes an intermediate position which results in a volume flow (Q) in the shock absorber which corresponds to a desired change in the damping force (F).

2. The proportional control valve as claimed in claim 1, wherein a duration of the time period (toverdrive) is set as a function of a piston speed (v) of a damper piston which is moved in a transitory fashion in the shock absorber.

3. The proportional control valve as claimed in claim 1, wherein a duration of the time period ($t_{overdrive}$) is set as a function of a magnitude of a change in the current strength ($I_{delta}$) which corresponds to a magnitude of a desired change in the damping force (F).

4. The proportional control valve as claimed in claim 1, wherein a duration of the time period ($t_{overdrive}$) is set as a function of the instantaneous level of the current strength ($I_{ist}$) prevailing before the change in the current strength (I).

5. The proportional control valve as claimed in claim 1, wherein a duration of the time period ($t_{overdrive}$) is set as a function of:
  a piston speed (v) of a damper piston which is moved in a transitory fashion in the shock absorber,
  a magnitude of a change in the current strength ($I_{delta}$) which corresponds to a magnitude of a desired change in the damping force (F), or
  the instantaneous level of the current strength ($I_{ist}$) prevailing before the change in the current strength (I).

6. The proportional control valve as claimed in claim 5, wherein parameters including at least one of the piston speed (v), the change in the current strength ($I_{delta}$), and the level of the current strength ($I_{ist}$), which are to be taken into account for setting the time period ($t_{overdrive}$), are either stored in a control device characteristic diagram or sensed in the shock absorber by real-time simulation of a force profile.

7. The proportional control valve as claimed in claim 5, wherein parameters including at least one of the piston speed (v), the change in the current strength ($I_{delta}$), and the level of the current strength ($I_{ist}$), which are to be taken into account for setting the time period ($t_{overdrive}$), are stored by forming suitable models in a control unit, wherein for the formation of models a viscosity of a shock absorber fluid is additionally sensed.

8. The proportional control valve as claimed in claim 5, wherein parameters including at least one of the piston speed (v), the change in the current strength ($I_{delta}$), and the level of the current strength ($I_{ist}$), which are to be taken into account for setting the time period ($t_{overdrive}$), are stored by forming suitable models in a control unit, wherein for the formation of models a modulus of elasticity of a shock absorber is additionally sensed.

9. The proportional control valve as claimed in claim 5, wherein parameters including at least one of the piston speed (v), the change in the current strength ($I_{delta}$), and the level of the current strength ($I_{ist}$), which are to be taken into account for setting the time period ($t_{overdrive}$), are stored by forming suitable models in a control unit, wherein for the formation of models a dynamic behavior of the proportional control valve is additionally sensed.

* * * * *